United States Patent (10) Patent No.: US 11,541,868 B2
Sakai et al. (45) Date of Patent: Jan. 3, 2023

(54) VEHICLE CONTROL DEVICE AND VEHICLE CONTROL METHOD

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/591,752

(22) Filed: Oct. 3, 2019

(65) Prior Publication Data

US 2020/0189563 A1 Jun. 18, 2020

(30) Foreign Application Priority Data

Dec. 14, 2018 (JP) .............................. JP2018-234497

(51) Int. Cl.
*B60W 20/12* (2016.01)
*G05D 1/02* (2020.01)
*B60W 50/00* (2006.01)

(52) U.S. Cl.
CPC ............. *B60W 20/12* (2016.01); *G05D 1/027* (2013.01); *B60W 2050/0075* (2013.01); *B60W 2556/10* (2020.02); *B60W 2556/50* (2020.02)

(58) Field of Classification Search
CPC ......... B60W 20/12; B60W 2050/0078; B60W 2050/0089; G05D 1/027; G01C 21/3476
See application file for complete search history.

(56) References Cited

U.S. PATENT DOCUMENTS 8,255,110 B2   8/2012  Taguchi
8,364,394 B2   1/2013  Taguchi
               (Continued)

FOREIGN PATENT DOCUMENTS

JP     3858506 B2 * 12/2006
JP    2010134851 A    6/2010
              (Continued)

OTHER PUBLICATIONS

Machine translation of JP-3858506-B2 (Year: 2006).*

*Primary Examiner* — Jeff A Burke
*Assistant Examiner* — Mohamad O El Sayah
(74) *Attorney, Agent, or Firm* — Dinsmore & Shohl LLP

(57) ABSTRACT

A vehicle control device includes: a storage portion in which map information is stored, the map information showing a position where a roadside machine configured to transmit a radio signal including predetermined information is provided; a route setting portion configured to set a route where an autonomous driving vehicle is to travel when a current position, of the autonomous driving vehicle, that is measured by a positioning portion provided in the autonomous driving vehicle is included within a predetermined distance from the position of the roadside machine on the map information and the autonomous driving vehicle approaches the position where the roadside machine is provided, the route being set so that a communication portion provided in the autonomous driving vehicle can receive the radio signal; and a vehicle controlling portion configured to control the autonomous driving vehicle so that the autonomous driving vehicle travels along the route.

4 Claims, 6 Drawing Sheets

(56) References Cited

U.S. PATENT DOCUMENTS

| | | | |
|---|---|---|---|
| 8,428,812 B2 | 4/2013 | Taguchi | |
| 8,660,778 B2 * | 2/2014 | Taguchi | |
| 9,057,620 B2 * | 6/2015 | Dave | H04W 24/08 |
| 9,067,571 B2 | 6/2015 | Matsunaga | |
| 9,096,266 B2 | 8/2015 | Irie | |
| 9,352,779 B2 | 5/2016 | Kindo et al. | |
| 9,886,852 B2 | 2/2018 | Urano | |
| 10,048,699 B2 | 8/2018 | Inoue et al. | |
| 10,198,944 B2 | 2/2019 | Urano | |
| 10,609,515 B1 * | 3/2020 | Bender | H04W 4/024 |
| 10,663,973 B2 | 5/2020 | Hashimoto et al. | |
| 10,754,347 B2 | 8/2020 | Kamata | |
| 10,832,062 B1 * | 11/2020 | Evans | B60W 30/00 |
| 11,275,382 B2 | 3/2022 | Hashimoto et al. | |
| 2003/0069690 A1 * | 4/2003 | Correia | G01C 21/3476 |
| | | | 701/431 |
| 2010/0070167 A1 * | 3/2010 | Mudalige | G01C 21/26 |
| | | | 701/31.4 |
| 2017/0176993 A1 | 6/2017 | Kato et al. | |
| 2017/0221366 A1 * | 8/2017 | An | G08G 1/096783 |

FOREIGN PATENT DOCUMENTS

| | | |
|---|---|---|
| JP | 2011227724 A | 11/2011 |
| JP | 2016-045101 A | 4/2016 |
| JP | 2017-175262 A | 9/2017 |

\* cited by examiner

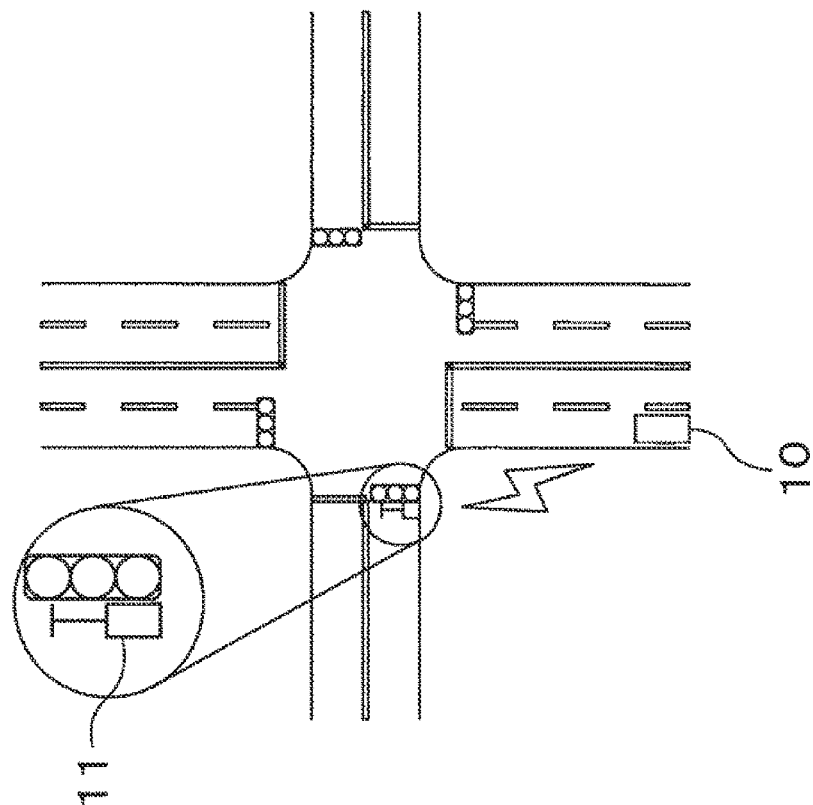
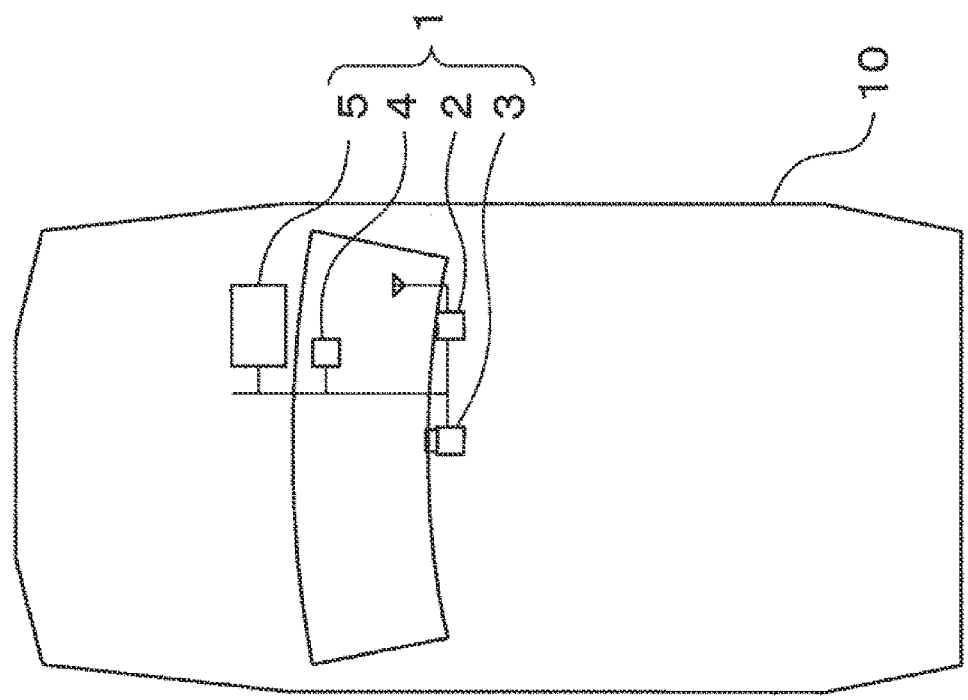
FIG. 1

VEHICLE CONTROL DEVICE AND VEHICLE CONTROL METHOD

CROSS REFERENCE TO RELATED APPLICATIONS

This nonprovisional application claims priority to Japanese Patent Application No. 2018-234497 filed on Dec. 14, 2018 with the Japan Patent Office, the entire contents of which are hereby incorporated by reference.

BACKGROUND

1. Technical Field

The present disclosure relates to a vehicle control device and a vehicle control method each for controlling an autonomous driving vehicle that can perform autonomous traveling.

2. Description of Related Art

There has been studied Intelligent Transport Systems (ITS) to provide safety or convenience to vehicle traveling by transmitting information on a vehicle or a road by wireless communication (so-called road-to-vehicle communication) between a roadside machine provided in the vicinity of a road and an in-vehicle transmitter or wireless communication (so-called vehicle-to-vehicle communication) between in-vehicle transmitters. For example, there has been proposed a technology in which a state of a traffic light at which a host vehicle is waiting is acquired by road-to-vehicle communication and used to support the host vehicle to start (see Japanese Unexamined Patent Application Publication No. 2010-134851 (JP 2010-134851 A), for example).

In such a technology, it is demanded that a vehicle can appropriately receive information transmitted by vehicle-to-vehicle communication or road-to-vehicle communication. In view of this, there has been proposed a technology for an in-vehicle terminal executing road-to-vehicle communication and vehicle-to-vehicle communication to set a receiving sensitivity appropriately in accordance with a communication target (see Japanese Unexamined Patent Application Publication No. 2011-227724 (JP 2011-227724 A), for example).

SUMMARY

However, depending on a positional relationship between the roadside machine and the vehicle, the vehicle might not receive a radio signal from the roadside machine.

In view of this, an object of the present disclosure is to provide a vehicle control device that controls traveling of an autonomous driving vehicle so that the autonomous driving vehicle can receive a radio signal from a roadside machine.

One aspect of the present disclosure provides a vehicle control device for controlling traveling of an autonomous driving vehicle that performs autonomous traveling. The vehicle control device includes a storage portion, a route setting portion, and a vehicle controlling portion. In the storage portion, map information is stored, and the map information shows a position where a roadside machine configured to transmit a radio signal including predetermined information is provided. The route setting portion is configured to set a route where the autonomous driving vehicle is to travel when a current position, of the autonomous driving vehicle, that is measured by a positioning portion provided in the autonomous driving vehicle is included within a predetermined distance from the position of the roadside machine on the map information and the autonomous driving vehicle approaches the position where the roadside machine is provided. The route is set so that a communication portion provided in the autonomous driving vehicle receives the radio signal. The vehicle controlling portion is configured to control the autonomous driving vehicle so that the autonomous driving vehicle travels along the route.

In the vehicle control device, the map information may further show a range where the radio signal is receivable. The route setting portion may set the route by referring to the map information so that the route overlaps with the range where the radio signal is receivable.

Further, the route setting portion may set the route so that a distance of the route included in the range where the radio signal is receivable is maximum.

The vehicle control device may further include a detecting portion and a tracking portion. The detecting portion may be configured to detect an object shown on each of a series of images sequentially provided from an imaging portion provided in the autonomous driving vehicle, by inputting the images into a discriminator learning in advance to detect a predetermined object. The tracking portion may be configured to track the object thus detected over the series of images. The route setting portion may set a target position of the autonomous driving vehicle at each time on the route so that the object thus tracked does not disturb reception of the radio signal from the roadside machine at a position of the autonomous driving vehicle at each time on the route.

Further, in the vehicle control device, the roadside machine may be provided at an intersection where a traffic light is provided. The predetermined information may include information indicative of a lighting state of the traffic light. When the route setting portion receives the radio signal via the communication portion, the route setting portion may set a target position of the autonomous driving vehicle at each time on the route by referring to the information indicative of the lighting state of the traffic light.

Another aspect of the present disclosure provides a vehicle control method for controlling traveling of an autonomous driving vehicle that performs autonomous traveling. The vehicle control method includes: setting a route where the autonomous driving vehicle is to travel when a current position, of the autonomous driving vehicle, that is measured by a positioning portion provided in the autonomous driving vehicle is included within a predetermined distance from a position of a roadside machine on map information and the autonomous driving vehicle approaches a position where the roadside machine is provided, the roadside machine being configured to transmit a radio signal including predetermined information, the route being set so that a communication portion provided in the autonomous driving vehicle receives the radio signal; and controlling the autonomous driving vehicle so that the autonomous driving vehicle travels along the route.

The vehicle control device according to the present disclosure yields an effect of controlling the traveling of the autonomous driving vehicle so that the autonomous driving vehicle can receive the radio signal from the roadside machine.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is a schematic configuration diagram of a vehicle control system in which a vehicle control device is provided;

DETAILED DESCRIPTION OF EMBODIMENTS

With reference to the drawings, the following describes a vehicle control device. The vehicle control device controls traveling of an autonomous driving vehicle that can perform autonomous traveling, by receiving a radio signal from a roadside machine by a communication terminal provided in the autonomous driving vehicle and using information included in the radio signal. At this time, when a current position of the autonomous driving vehicle is included within a predetermined distance from a position where the roadside machine is provided and when the autonomous driving vehicle approaches the position where the roadside machine is provided, the vehicle control device sets a route (hereinafter just referred to as a planned travel route) where the autonomous driving vehicle is to travel, so that the vehicle control device can receive the radio signal.

The following describes an example in which a roadside machine is provided at an intersection where a traffic light is provided and transmits a radio signal including information (hereinafter referred to as a traffic-light state information) indicative of a lighting state of the traffic light. In this example, the vehicle control device refers to the traffic-light state information included in the radio signal received from the roadside machine by a wireless terminal provided in the autonomous driving vehicle and determines whether the autonomous driving vehicle temporarily stops at the intersection where the traffic light is provided or passes through the intersection without stopping.

Figure 2:
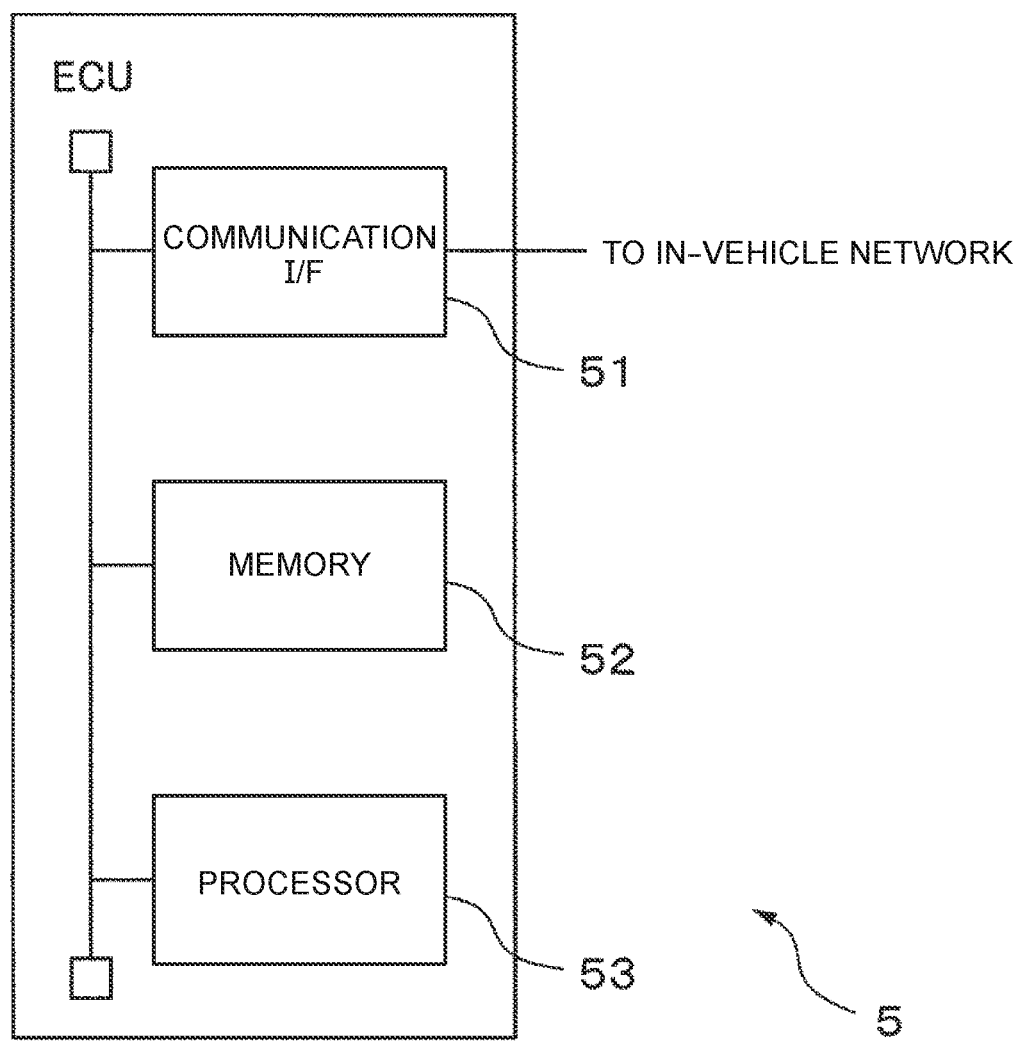
FIG. 2 is a hardware configuration diagram of an electronic control unit as one embodiment of the vehicle control device.

FIG. 1 is a schematic configuration diagram of a vehicle control system in which the vehicle control device is provided. Further, FIG. 2 is a hardware configuration diagram of an electronic control unit as one embodiment of the vehicle control device. In the present embodiment, a vehicle control system 1 provided in a vehicle 10 as an example of the autonomous driving vehicle that can perform autonomous traveling and configured to control the vehicle 10 includes a communication terminal 2, a camera 3, a positioning device 4, and an electronic control unit (ECU) 5. The communication terminal 2, the camera 3, and the positioning device 4 are connected to the ECU 5 communicably via an in-vehicle network provided in the vehicle 10 and conforming to the standard such as Controller Area Network (CAN). The vehicle 10 may further include: a vehicle outside sensor (not shown) such as a radar or a LIDAR sensor configured to obtain information around the vehicle 10; a storage device (not shown) in which map information is stored, the storage device including a magnetic recording medium or a photo-recording medium, and an access unit thereof; and a navigation system (not shown) configured to find a travel route from a current location of the vehicle 10 to a moving destination in accordance with a predetermined route search technique such as the Dijkstra method. Note that details of the map information will be described later.

The communication terminal 2 is an example of a communication portion and includes an antenna and a signal processing circuit configured to execute various processes related to wireless communication (e.g., Dedicated Short Range Communications) conforming to the wireless communication standard between a roadside machine and an in-vehicle communications device. The various processes include modulation and demodulation of a radio signal. The communication terminal 2 is provided in the vicinity of an intersection, for example, and is configured to be wirelessly communicable with a roadside machine 11 that transmits a radio signal including traffic-light state information on a traffic light at the intersection. Every time the communication terminal 2 receives a radio signal from the roadside machine 11, the communication terminal 2 sends traffic-light state information included in the radio signal to the ECU 5 via the in-vehicle network.

The camera 3 is an example of an imaging portion and includes a two-dimensional detector such as CCD or C-MOS that is constituted by an array of photoelectric conversion elements having sensitivity to visible light, and an imaging system configured to generate an image of a region targeted for image capture on the two-dimensional detector. The camera 3 is attached inside a vehicle cabin of the vehicle 10 to face forward from the vehicle 10, for example. The camera 3 captures an image of a front region in front of the vehicle 10 every predetermined image-capture period (e.g., 1/30 seconds to 1/10 seconds) and generates a color image (hereinafter just referred to as an image) of the front region.

Every time the camera 3 generates an image, the camera 3 outputs the image thus generated to the ECU 5 via the in-vehicle network.

The positioning device 4 is an example of a positioning portion and measures a current position of the vehicle 10 every predetermined period. For this purpose, the positioning device 4 may include, for example, a receiver configured to receive a global positioning system (GPS) signal, and a computing circuit configured to calculate the current position of the vehicle 10 from the GPS signal. Further, the positioning device 4 may be incorporated into a navigation system. Every time the positioning device 4 measures the current position of the vehicle 10, the positioning device 4 outputs a measured value to the ECU 5 via the in-vehicle network.

The ECU 5 is an example of the vehicle control device and controls the vehicle 10 to perform autonomous traveling and controls each part of the vehicle 10. For example, while the ECU 5 is referring to the traffic-light state information and an image provided by the camera 3, the ECU 5 controls the vehicle 10 so that the vehicle 10 travels along a travel route found by the navigation system. On this account, the ECU 5 includes a communication interface 51, a memory 52, and a processor 53.

The communication interface 51 includes an interface circuit configured to connect the ECU 5 to the in-vehicle network. That is, the communication interface 51 is connected to the communication terminal 2, the camera 3, and the positioning device 4 via the in-vehicle network. Every time the communication interface 51 receives traffic-light state information from the communication terminal 2, the communication interface 51 sends the traffic-light state information thus received to the processor 53. Similarly, every time the communication interface 51 receives an image from the camera 3, the communication interface 51 sends the image thus received to the processor 53, and every time the communication interface 51 receives a measured value of the current position of the vehicle 10 from the positioning device 4, the communication interface 51 sends the measured value to the processor 53. Further, the communication interface 51 sends information indicative of a travel route, received from the navigation system, to the processor 53.

The memory 52 is an example of a storage portion and includes, for example, a volatile semiconductor memory and a nonvolatile semiconductor memory. In the memory 52, data to be used in various processes executed by the processor 53 of the ECU 5 is stored. The data includes, for example, the traffic-light state information, the current position of the vehicle 10, the travel route, the image received from camera 3, and so on. Further, the map information may be stored in the memory 52.

In the present embodiment, in terms of an intersection where a traffic light is provided, the map information includes a position of the intersection and information indicative of an area (hereinafter just referred to as a coverage area) where a radio signal, including traffic-light state information of the traffic light, from the roadside machine is receivable.

Figure 3:
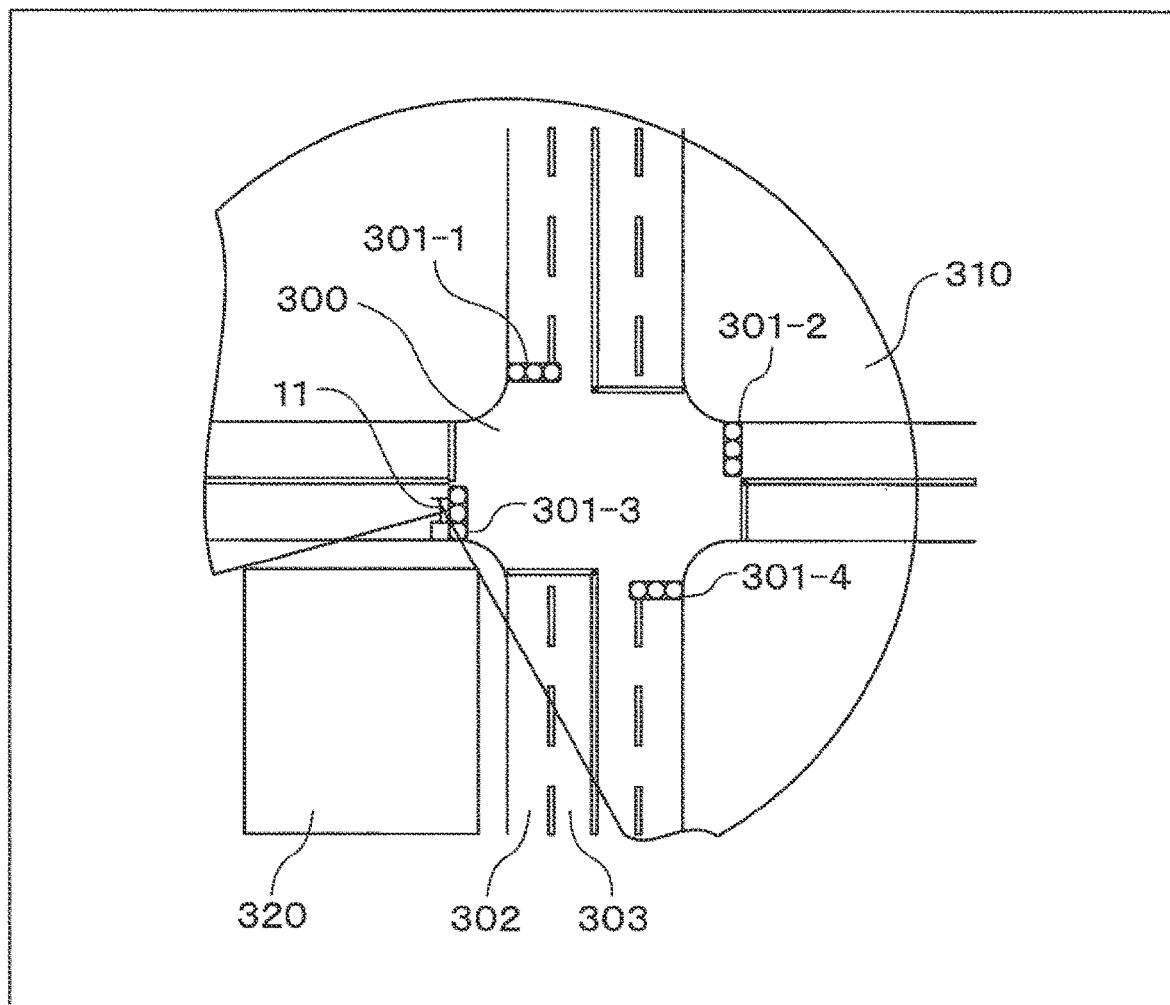
FIG. 3 is a view illustrating one example of a coverage area shown on map information.

FIG. 3 is a view illustrating one example of the coverage area shown on the map information. A coverage area 310 illustrated in FIG. 3 indicates that the vehicle 10 can receive the radio signal from the roadside machine 11 provided at an intersection 300 when the vehicle 10 is placed inside the area. The radio signal includes traffic-light state information indicative of lighting states of four traffic lights 301-1 to 301-4 at the intersection 300. In this example, the roadside machine 11 is provided in the vicinity of the traffic light 301-3 on the left lower side in the intersection 300. On this account, in terms of a left lane 302 out of two lanes 302, 303 directed from the lower side to the upper side in the figure, the radio signal from the roadside machine 11 is blocked by a building 320 placed on the left lower side from the intersection 300. On this account, it is hard for the radio signal from the roadside machine 11 to reach the left lane 302 as compared with the right lane 303. Accordingly, a distance from the intersection 300 to a border of the coverage area 310 in the left lane 302 is shorter than a distance from the intersection 300 to the border of the coverage area 310 in the right lane 303. On this account, in a case where the vehicle 10 approaches the intersection 300 from the lower side, it is found that the vehicle 10 can more easily receive the radio signal from the roadside machine 11 when the vehicle 10 travels on the right lane 303 than when the vehicle 10 travels on the left lane 302. As such, when the ECU 5 refers to the map information, the ECU 5 can set a planned travel route where the vehicle 10 can receive the radio signal from the roadside machine 11.

The processor 53 is an example of a controlling portion and includes one or more central processing units (CPU) and a peripheral circuit thereof. The processor 53 may further include other computing circuits such as a logic-arithmetic unit, a mathematical operation unit, or a graphics processing unit. While the vehicle 10 is traveling, the processor 53 executes a vehicle control process to cause the vehicle 10 to perform autonomous traveling.

Figure 4:
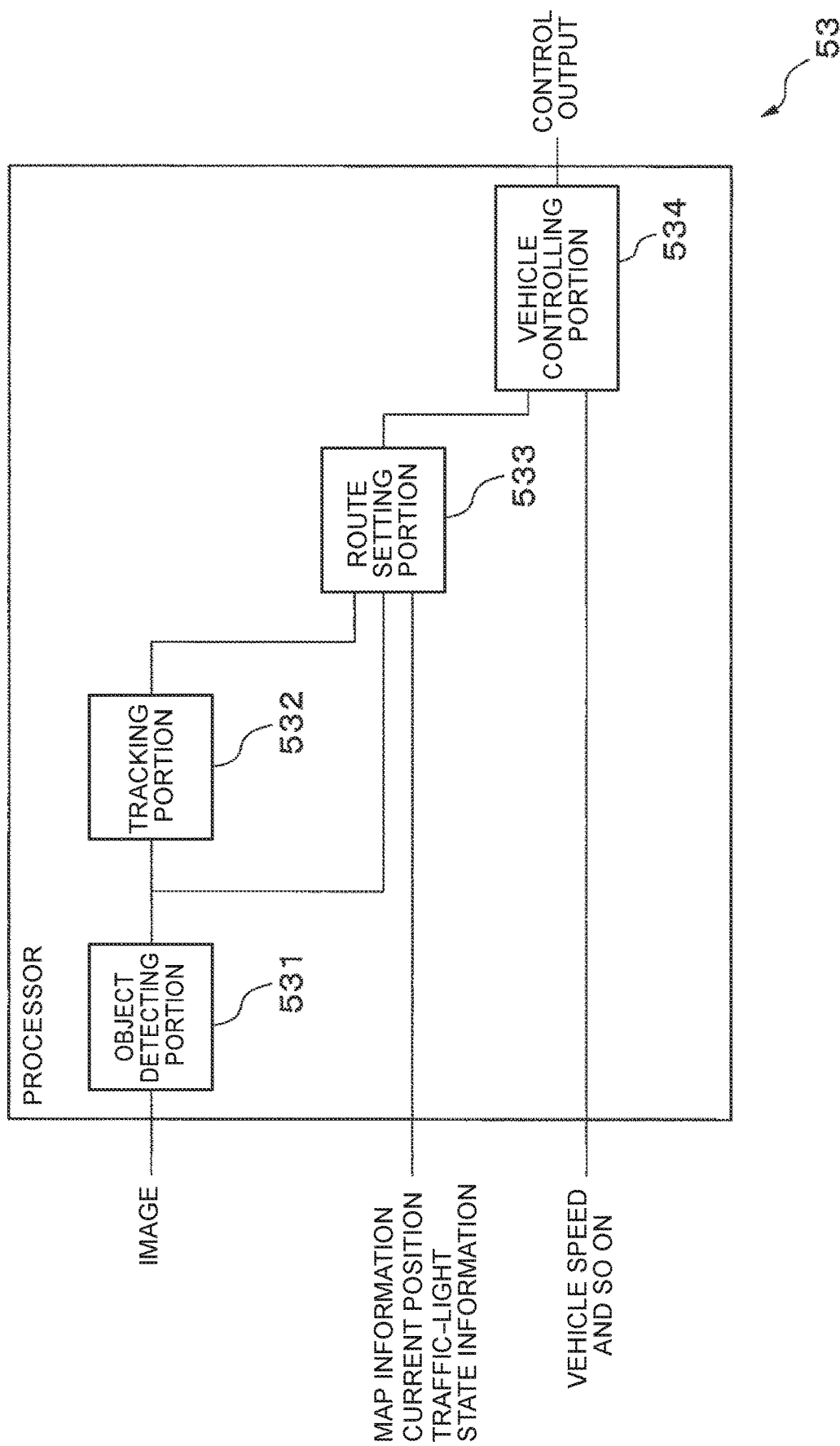
FIG. 4 is a functional block diagram of a processor of the electronic control unit in terms of a vehicle control process.

FIG. 4 is a functional block diagram of the processor 53 of the ECU 5 in terms of the vehicle control process. The processor 53 includes an object detecting portion 531, a tracking portion 532, a route setting portion 533, and a vehicle controlling portion 534. These portions provided in the processor 53 are functional modules implemented by a computer program that works on the processor 53, for example. Alternatively, these portions provided in the processor 53 may be exclusive computing circuits provided in the processor 53.

The object detecting portion 531 detects an object shown on each of a series of images sequentially generated by the camera 3.

For example, every time the object detecting portion 531 acquires an image from the camera 3, the object detecting portion 531 inputs the image into a discriminator so as to detect an object shown on the image thus input. As such a discriminator, the object detecting portion 531 can use a deep neural network (DNN) learning in advance to detect an object shown on an image input therein, for example. As the DNN, the object detecting portion 531 can use, for example, a DNN having an architecture of a convolutional neural network type, such as a single shot multibox detector (SSD) or Faster R-CNN. In this case, when the object detecting portion 531 inputs an image into the DNN-type discriminator, the discriminator calculates a certainty factor indicative of a probability that an object is shown in a region. The certainty factor is calculated with respect to various regions on the input image for each type of an object as a detection target (e.g., a small-size vehicle, a large-size vehicle, people, a traffic light, and the like). When the certainty factor of an object of a given type is a predetermined detection threshold or more in a given region, the discriminator determines that the object of the given type is shown in the given region. Then, the discriminator outputs information indicative of the region where the object as the detection target is included on the input image (e.g., a circumscribed rectangle of the object as the detection target, hereinafter referred to as an object region) and information indicative of the type of the object shown in the object region.

Alternatively, the object detecting portion 531 may use a discriminator other than the DNN. For example, as the discriminator, the object detecting portion 531 may use a support vector machine (SVM) learning in advance to receive a feature amount calculated from a window set on an image (e.g., Histograms of Oriented Gradients, HOG) as an input and to output a certainty factor indicative of a probability that an object as a detection target is shown on the window. While the object detecting portion 531 variously changes a position, a size, and an aspect ratio of the window set on the image, the object detecting portion 531 calculates a feature amount from the window and inputs the calculated feature amount into the SVM, so as to find the certainty factor about the window. When the certainty factor is a predetermined detection threshold or more, the object detecting portion 531 takes the window as an object region in which the object as the detection target is shown.

The object detecting portion 531 outputs a position and a range of the object region detected from the image and a type of the detected object to the tracking portion 532 and the route setting portion 533.

The tracking portion 532 tracks an object detected from the series of images in accordance with a predetermined tracking technique. For example, the tracking portion 532 executes a viewpoint conversion process on each image by use of information such as an attachment position of the camera 3 to the vehicle 10, so as to convert the image into an overview image. At this time, the tracking portion 532 may estimate a distance from the vehicle 10 to the object based on a size of the object region detected on the image and specify a position of each point on the detected object on the overview image based on the estimated distance. For example, for each type of an object as the detection target, a reference size of the object on an image in a case where a distance from the vehicle 10 to the object is a predetermined reference distance is stored in the memory 52 in advance. Then, the tracking portion 532 takes, as an estimation distance to a detected object, a distance obtained by multiplying, by the reference distance, a ratio of the reference size corresponding to the detected object to a size of an object region detected on the image. Alternatively, the tracking portion 532 may take, as the estimation distance to the detected object, a distance to the object in a direction corresponding to a position of the object region on the image, the distance being provided by the vehicle outside sensor. Then, the tracking portion 532 executes a tracking process using Kalman Filter, Particle Filter, or the like on a series of overview images so that the same objects among objects detected from the overview images are associated with each other, and hereby, the tracking portion 532 tracks an object detected from the series of images.

Alternatively, the tracking portion 532 may associate an object detected from a latest image with objects detected from past images in accordance with a tracking process based on an optical flow, so as to track an object detected from the series of images.

The tracking portion 532 gives a label, different from labels for object regions in which other objects are shown, to object regions of respective images in which the objects associated with each other as the same object in the series of images are shown, so that the object region in which the object is shown is identified per tracked object. Then, the tracking portion 532 outputs a track result to the route setting portion 533 for each tracked object. The track result is, for example, the label corresponding to the object and the object region in each image to which the label is assigned, a position of each tracked object on each overview image, or the like.

The route setting portion 533 generates a planned travel route for the vehicle 10 so that the vehicle 10 travels along a travel route set by the navigation system and the vehicle 10 does not collide with an object present around the vehicle 10, the object being detected in each image. At this time, the route setting portion 533 sets the planned travel route so that, when the vehicle 10 approaches the intersection where the roadside machine 11 is provided, the vehicle 10 can receive the radio signal from the roadside machine 11. Based on the traffic-light state information included in the radio signal received from the roadside machine 11 via the communication terminal 2, the route setting portion 533 determines whether the vehicle 10 temporarily stops at the intersection where the roadside machine 11 is provided or passes through the intersection without stopping. The planned travel route is shown as a set of target positions of the vehicle 10 at respective times from a current time to a predetermined time, for example.

For example, the route setting portion 533 reads out map information from the memory 52 or a storage device and determines, by referring to the map information thus read out, whether a current position of the vehicle 10 is included within a predetermined distance from a reference point (e.g., the center point of the intersection or a position where the roadside machine 11 is provided) of the intersection where the roadside machine 11 is provided in the travel direction of the vehicle 10 in the travel route of the vehicle 10. Note that the predetermined distance can be, for example, a distance obtained by adding a predetermined offset (e.g., 100 m to 500 m) to a maximum value of a distance from the reference point of the intersection where the roadside machine 11 is provided to an outer edge of the coverage area. In a case where the current position of the vehicle 10 is included in the predetermined distance, the route setting portion 533 refers to the coverage area shown on the map information and sets a planned travel route so that the planned travel route and the coverage area overlap with each other. For example, the route setting portion 533 may check the number of lanes where the vehicle 10 can travel by referring to the current position of the vehicle 10 and the map information. Then, for example, it is assumed that a road where the vehicle 10 is traveling includes a plurality of lanes in the travel direction of the vehicle 10, and the radio signal from the roadside machine 11 is blocked in one of the lanes so that the radio signal does not reach the one of the lanes, while the radio signal reaches the other lanes. In such a case, the route setting portion 533 should set the planned travel route so that the vehicle 10 travels in any of the lanes that the radio signal from the roadside machine 11 reaches, from among the lanes. Hereby, the communication terminal 2 can receive the radio signal from the roadside machine 11. Particularly, in order that the communication terminal 2 can receive the radio signal from the roadside machine 11 for a longer period, in some embodiments, the route setting portion 533 sets the planned travel route so that a distance in which the planned travel route and the coverage area overlap with each other is maximum. For example, in a case where the road where the vehicle 10 travels includes a plurality of lanes in terms of the travel direction of the vehicle 10, the route setting portion 533 sets the planned travel route so that the vehicle 10 travels in a lane in which a distance included in the coverage area is maximum, among the lanes. Alternatively, in terms of the lane where the vehicle 10 travels, when the right end side and the left end side of the lane in the travel direction of the vehicle 10 have different distances included in the coverage area, the route setting portion 533 may set the planned travel route so that the vehicle 10 travels on a side with a longer distance included in the coverage area out of the right end side and the left end side of the lane where the vehicle 10 travels. Alternatively, the route setting portion 533 may set the planned travel route in accordance with an optimization technique such as simulated annealing so that the distance included in the coverage area becomes longest.

Further, when there is an object that blocks the radio signal from the roadside machine 11, e.g., a large-size vehicle such as a bus or a truck, between the vehicle 10 and the roadside machine 11, it is difficult for the vehicle 10 to receive the radio signal from the roadside machine 11. In view of this, for example, in a case where a large-size vehicle detected by the object detecting portion 531 and tracked by the tracking portion 532 travels in front of the vehicle 10, in some embodiments, the route setting portion 533 sets a position of the vehicle 10 at each time on the planned travel route so that the large-size vehicle does not disturb the reception of the radio signal from the roadside machine 11 at a target position of the vehicle 10 at each time on the planned travel route.

For example, the roadside machine 11 may be set at a relatively high position, and therefore, when a distance between the vehicle 10 and the large-size vehicle is large, the large-size vehicle is not placed between the vehicle 10 and the roadside machine 11 so that the large-size vehicle does not block the radio signal from the roadside machine 11. In view of this, the route setting portion 533 estimates a prediction locus of the large-size vehicle up to a predetermined time from a locus of the tracked large-size vehicle traveling in front of the vehicle 10, the locus being obtained by a tracking result by the tracking portion 532. The route setting portion 533 determines a target position of the vehicle 10 at each time on the planned travel route based on the prediction locus of the tracked large-size vehicle, so that a predicted value of the distance between the tracked large-size vehicle and the vehicle 10 up to the predetermined time is a predetermined distance (e.g., 20 m to 50 m) or more.

Further, the route setting portion 533 may set the planned travel route based on the prediction locus of the large-size vehicle so that a lane where the vehicle 10 travels is different from a lane where the large-size vehicle traveling in front of the vehicle 10 travels. At this time, in some embodiments, the route setting portion 533 sets the planned travel route so that the vehicle 10 travels in a lane closer to the roadside machine 11 than a lane where the large-size vehicle travels. Hereby, it is possible to restrain the radio signal from the roadside machine 11 from being blocked by the large-size vehicle traveling in front of the vehicle 10. Note that, also in this case, the route setting portion 533 should set the planned travel route so that the planned travel route and the coverage area overlap with each other.

Further, when the current position of the vehicle 10 is included in the coverage area and the route setting portion 533 receives the radio signal including the traffic-light state information from the roadside machine 11, the route setting portion 533 refers to the traffic-light state information and determines a target position of the vehicle 10 at each time on the planned travel route. That is, in a case where the traffic-light state information indicates that the traffic light for the lane where the vehicle 10 is traveling requests the vehicle 10 to stop (that is, in a case where a lighting color of the traffic light is "red," "yellow," or "flashing red"), the route setting portion 533 determines the target position of the vehicle 10 at each time on the planned travel route so that the vehicle 10 temporarily stops at a position of a stop line before the intersection. In the meantime, in a case where the traffic-light state information indicates that the traffic light on the lane where the vehicle 10 is traveling permits the vehicle 10 to pass through the intersection (that is, in a case where the lighting color of the traffic light is "blue" or "flashing yellow," or in a case where an arrow traffic light in the travel direction along the travel route is lighted), the route setting portion 533 determines the target position of the vehicle 10 at each time on the planned travel route so that the vehicle 10 passes through the intersection without stopping at the intersection.

Further, after the vehicle 10 has passed through the intersection where the roadside machine 11 is provided or the vehicle 10 is away from the reference point of the intersection by more than a predetermined distance, the route setting portion 533 should set the planned travel route so that the vehicle 10 travels along the travel route and the vehicle 10 does not collide with each object tracked by the tracking portion 532. For example, the route setting portion 533 estimates prediction loci of tracked objects up to a predetermined time from loci of the tracked objects. The route setting portion 533 should generate the planned travel route for the vehicle 10 based on the prediction loci of the tracked objects, so that a predicted value of a distance between each of the tracked objects and the vehicle 10 up to the predetermined time is a predetermined lower limit distance or more in terms of each of the tracked objects.

Figure 5:
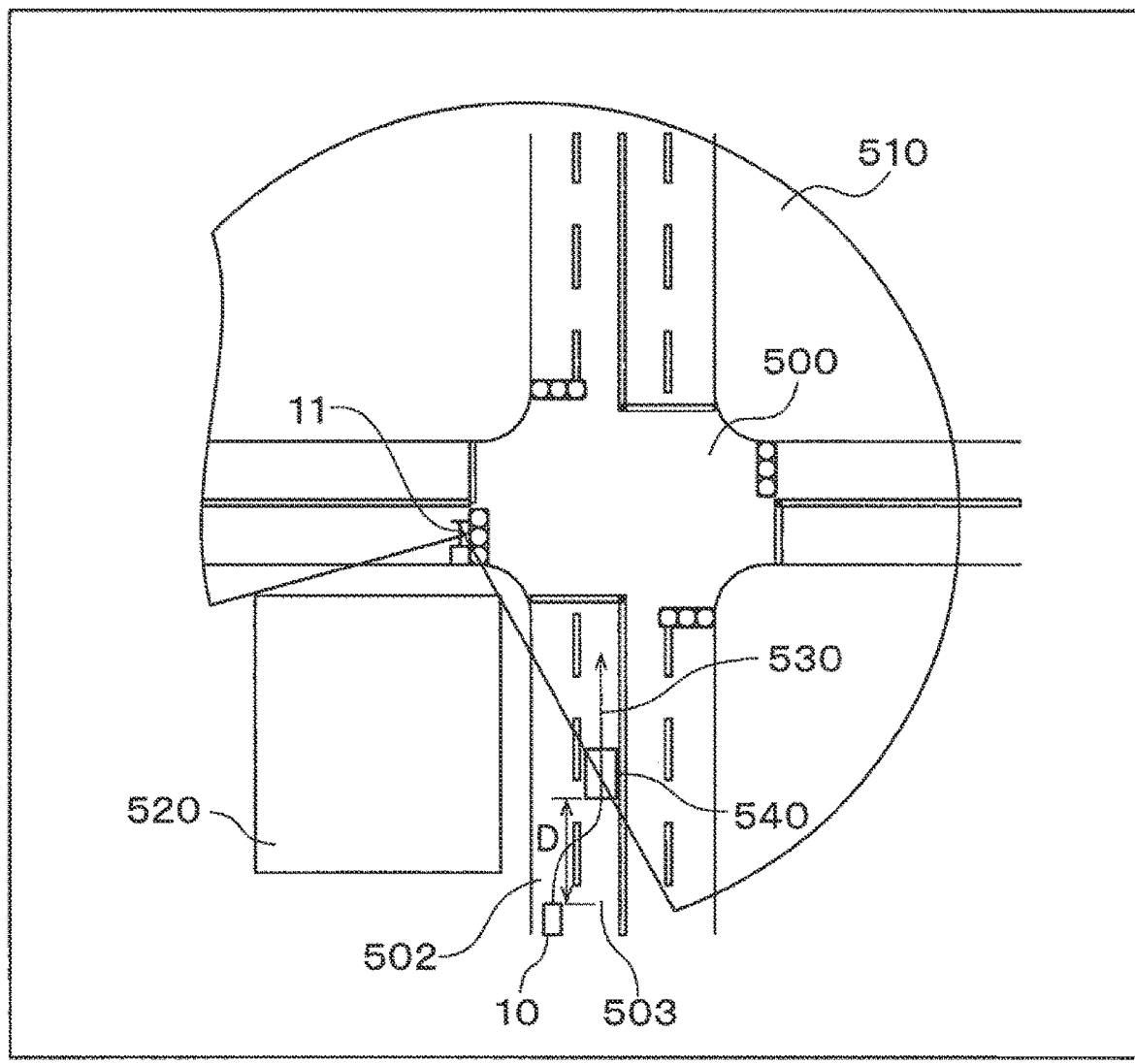
FIG. 5 is a view illustrating an exemplary relationship between a coverage area and a planned travel route.

FIG. 5 is a view illustrating an exemplary relationship between the coverage area and the planned travel route. In the example illustrated in FIG. 5, the vehicle 10 travels from the lower side to the upper side in the figure. Similarly to the example illustrated in FIG. 3, in terms of a left lane 502 out of two lanes 502, 503 directed from the lower side to the upper side in the figure, the radio signal from the roadside machine 11 is blocked by a building 520 placed on the left lower side from the intersection 500. On this account, a range that the radio signal from the roadside machine 11 reaches is narrower in the left lane 502 than in the right lane 503. On this account, in order to lengthen a travel distance within a coverage area 510, a planned travel route 530 is set so that the vehicle 10 travels on the right lane 503. Further, in the example illustrated in FIG. 5, since a large-size vehicle 540 travels in front of the vehicle 10, the target position of the vehicle 10 at each time on the planned travel route 530 should be set so that a distance between the large-size vehicle 540 and the vehicle 10 is a predetermined distance D or more at a position at each time on the planned travel route 530.

The route setting portion 533 notifies the vehicle controlling portion 534 of the planned travel route thus generated.

The vehicle controlling portion 534 controls each part of the vehicle 10 so that the vehicle 10 travels along the planned travel route thus notified. For example, the vehicle controlling portion 534 sequentially finds an acceleration for the vehicle 10 to move to the target position at each time on the planned travel route in accordance with the planned travel route thus notified and a current vehicle speed of the vehicle 10 that is measured by a vehicle speed sensor (not shown), and the vehicle controlling portion 534 sets an accelerator operation amount or a brake amount so as to achieve the acceleration. Then, the vehicle controlling portion 534 finds a fuel injection amount in accordance with the accelerator operation amount thus set and outputs a control signal corresponding to the fuel injection amount to a fuel injection device of an engine of the vehicle 10. Alternatively, the vehicle controlling portion 534 outputs a control signal corresponding to the brake amount thus set to a brake of the vehicle 10.

Further, in a case where the course of the vehicle 10 is changed so that the vehicle 10 travels along the planned travel route, the vehicle controlling portion 534 finds a steering angle of the vehicle 10 in accordance with the planned travel route and outputs a control signal corresponding to the steering angle to an actuator (not shown) configured to control a steering wheel of the vehicle 10.

Figure 6:
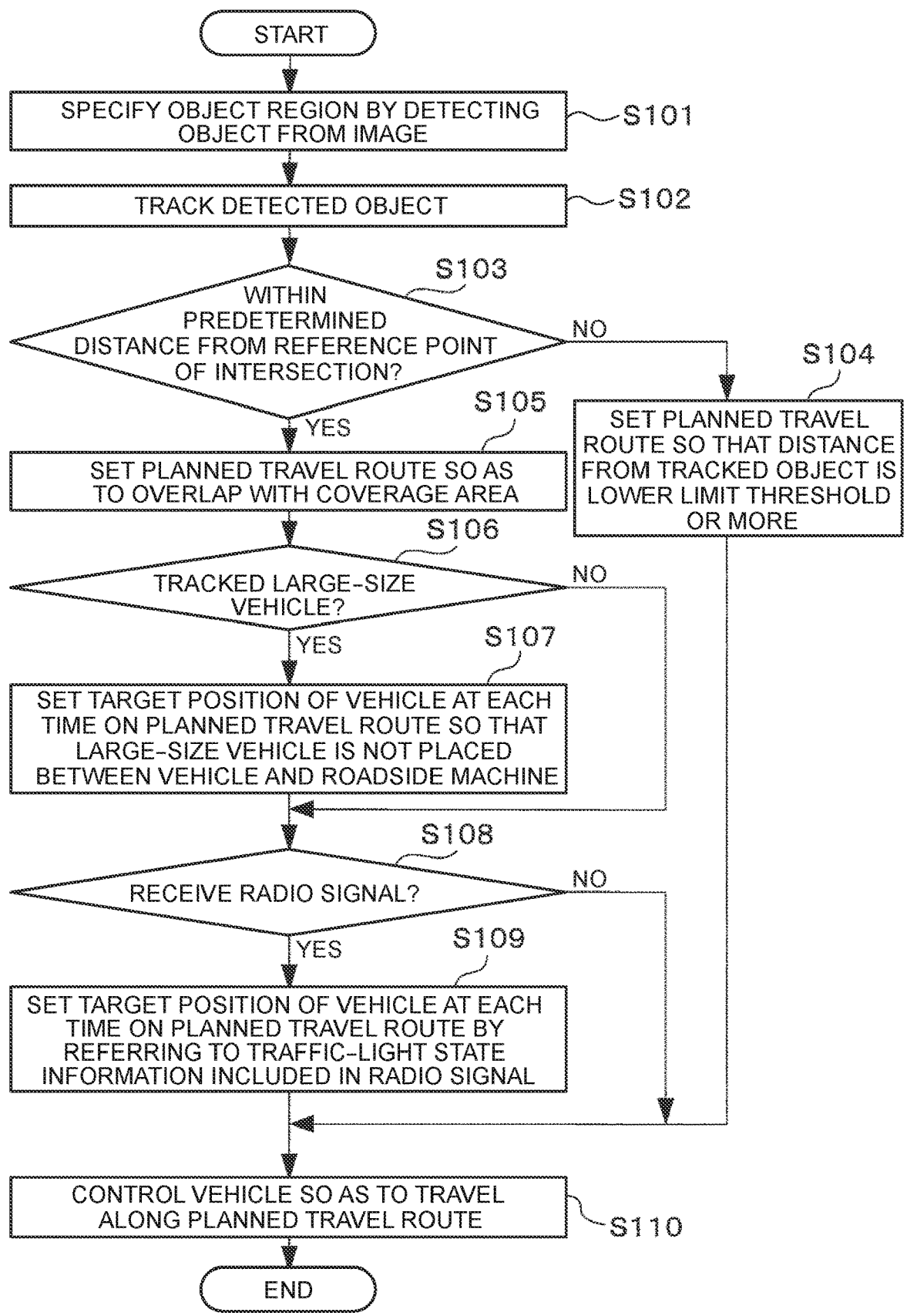
FIG. 6 is an operation flowchart of the vehicle control process.

FIG. 6 is an operation flowchart of the vehicle control process executed by the processor 53. The processor 53 executes the vehicle control process every predetermined period in accordance with the operation flowchart illustrated in FIG. 6.

The object detecting portion 531 of the processor 53 detects an object in a latest image obtained from the camera 3 and finds an object region where the detected object is shown (step S101). Then, the tracking portion 532 of the processor 53 tracks objects detected from past images and the latest image (step S102).

The route setting portion 533 of the processor 53 refers to the current position of the vehicle 10 and the map information and determines whether or not the current position of the vehicle 10 is included within a predetermined distance from the reference point of the intersection where the roadside machine 11 is provided in the travel direction of the vehicle 10 in the travel route of the vehicle 10 (step S103). In a case where the current position of the vehicle 10 is distanced from the reference point by more than the predetermined distance (step S103: No), the route setting portion 533 sets a planned travel route so that the vehicle 10 travels along the travel route and a distance from each tracked object is a predetermined lower limit threshold or more (step S104).

In the meantime, in a case where the current position of the vehicle 10 is included in the predetermined distance (step S103: Yes), the route setting portion 533 refers to the coverage area shown on the map information and sets a planned travel route so that the planned travel route and the coverage area overlap with each other (step S105). At this time, as described above, in some embodiments, the route setting portion 533 sets the planned travel route so that a distance of the planned travel route included in the coverage area is maximum. Further, the route setting portion 533 determines whether or not the tracked objects include a large-size vehicle traveling in front of the vehicle 10 (step S106). When the tracked objects include the large-size vehicle traveling in front of the vehicle 10 (step S106: Yes), the route setting portion 533 refers to a prediction locus found from a tracking result of the large-size vehicle, and the route setting portion 533 sets a target position of the vehicle 10 at each time on the planned travel route so that the large-size vehicle is not placed between the vehicle 10 and the roadside machine 11 (step S107).

After step S107 or when the tracked objects do not include the large-size vehicle traveling in front of the vehicle 10 in step S106 (step S106: No), the route setting portion 533 determines whether or not the vehicle 10 has received a radio signal from the roadside machine 11 (step S108). When the vehicle 10 has received the radio signal from the roadside machine 11 (step S108: Yes), the route setting portion 533 refers to traffic-light state information included in the radio signal and determines a target position of the vehicle 10 at each time on the planned travel route (step S109).

After step S104 or S109, or when the vehicle 10 cannot receive the radio signal from the roadside machine 11 in step S108 (step S108: No), the vehicle controlling portion 534 of the processor 53 controls the vehicle 10 so that the vehicle 10 travels along the planned travel route (step S110). Then, the processor 53 finishes the vehicle control process.

As has been described above, when an autonomous driving vehicle that can perform autonomous traveling approaches an intersection where a roadside machine is provided, the vehicle control device sets a planned travel route for the autonomous driving vehicle so that a communication terminal provided in the autonomous driving vehicle can receive a radio signal including traffic-light state information from the roadside machine. On this account, the vehicle control device can restrain such a situation that the autonomous driving vehicle cannot acquire the traffic-light state information and cannot determine whether or not the autonomous driving vehicle should stop at the intersection.

In a modification, in terms of the intersection where the roadside machine 11 is provided, when the vehicle 10 cannot receive the radio signal from the roadside machine 11 even when a given period has elapsed after the vehicle 10 enters the coverage area, the route setting portion 533 may determine a lighting state of the traffic light based on a lighting color, of the traffic light, that is detected from an image by the object detecting portion 531 and may determine, based on the determination result, whether or not the vehicle 10 temporarily stops before the intersection or passes through the intersection without stopping.

Note that the information included in the radio signal transmitted from the roadside machine is not limited to the traffic-light state information. The radio signal transmitted from the roadside machine may include, for example, information indicative of a traffic condition such as a point where a traffic jam has occurred, a length of a traffic jam, or a point where an accident has occurred. Further, the position where the roadside machine is provided is also not limited to the vicinity of the intersection. In this case, similarly to the embodiment or the modification, when the current position of the vehicle 10 that is measured by the positioning device 4 is included within a predetermined distance from a position where the roadside machine is provided, the position being shown on the map information, and the vehicle 10 approaches the position where the roadside machine is provided, the route setting portion 533 should set the planned travel route for the vehicle 10 so that the communication terminal 2 can receive the radio signal from the roadside machine.

Further, a computer program to implement a function of each part of the processor 53 of the vehicle control device in the embodiment or the modification may be provided in such a form that the computer program is stored in a portable computer-readable recording medium such as a semiconductor memory, a magnetic recording medium, or a photo-recording medium.

As described above, a person skilled in the art can perform various changes in accordance with a form to be carried out within the scope of the present disclosure.

What is claimed is:

1. A vehicle control device for controlling traveling of an autonomous driving vehicle that performs autonomous traveling, the vehicle control device comprising:
   a memory in which map information is stored, the map information showing a position where a roadside machine configured to transmit a radio signal including predetermined information is provided, and showing a range where the radio signal is receivable; and
   a processor configured to:
   set a route where the autonomous driving vehicle is to travel when a current position, of the autonomous driving vehicle, that is measured by a positioning portion provided in the autonomous driving vehicle is included within a predetermined distance from the position of the roadside machine on the map information and the autonomous driving vehicle approaches the position where the roadside machine is provided, the route being set by referring to the map information so that the autonomous driving vehicle travels on a lane of at least two lanes or so that autonomous driving travels with a distance between the autonomous driving vehicle and another vehicle traveling in front of the autonomous driving vehicle being a predetermined distance or more so that a communication portion provided in the autonomous driving vehicle receives the radio signal, the route overlaps with the range where the radio signal is receivable, and a portion of the route included in the range where the radio signal is receivable comprises a maximum possible distance; and
   control the autonomous driving vehicle so that the autonomous driving vehicle travels along the route.

2. The vehicle control device according to claim 1, wherein the processor is further configured to:
   detect an object shown on each of a series of images sequentially provided from an imaging portion provided in the autonomous driving vehicle, by inputting the images into a discriminator learning in advance to detect a predetermined object; and
   track the object thus detected over the series of images, wherein the processor sets a target position of the autonomous driving vehicle at each time on the route so that the object thus tracked does not disturb reception of the radio signal from the roadside machine at a position of the autonomous driving vehicle at each time on the route.

3. The vehicle control device according to claim 1, wherein:

the roadside machine is provided at an intersection where a traffic light is provided;

the predetermined information includes information indicative of a lighting state of the traffic light; and when the processor receives the radio signal via the communication portion, the processor sets a target position of the autonomous driving vehicle at each time on the route by referring to the information indicative of the lighting state of the traffic light.

4. A vehicle control method for controlling traveling of an autonomous driving vehicle that performs autonomous traveling, the vehicle control method comprising:

setting a route where the autonomous driving vehicle is to travel when a current position, of the autonomous driving vehicle, that is measured by a positioning portion provided in the autonomous driving vehicle is included within a predetermined distance from a position of a roadside machine on map information and the autonomous driving vehicle approaches a position where the roadside machine is provided, the roadside machine being configured to transmit a radio signal including predetermined information, the route being set by referring to the map information so that the autonomous driving vehicle travels on a lane of at least two lanes or so that autonomous driving travels with a distance between the autonomous driving vehicle and another vehicle traveling in front of the autonomous driving vehicle being a predetermined distance or more so that a communication portion provided in the autonomous driving vehicle receives the radio signal, the route overlaps with a range where the radio signal is receivable, and a portion of the route included in the range where the radio signal is receivable comprises a maximum possible distance; and controlling the autonomous driving vehicle so that the autonomous driving vehicle travels along the route.

* * * * *